US010519339B2

(12) United States Patent
Larsen et al.

(10) Patent No.: US 10,519,339 B2
(45) Date of Patent: Dec. 31, 2019

(54) METHOD FOR APPLYING A COATING TO A POLYMERIC SUBSTRATE

(71) Applicant: Sophion Bioscience A/S, Ballerup (DK)

(72) Inventors: Esben Kjaer Unmack Larsen, Copenhagen (DK); Niels Bent Larsen, Rødovre (DK)

(73) Assignee: Sophion Bioscience A/S, Ballerup (DK)

( * ) Notice: Subject to any disclaimer, the term of this patent is extended or adjusted under 35 U.S.C. 154(b) by 490 days.

(21) Appl. No.: 14/431,799

(22) PCT Filed: Sep. 27, 2013

(86) PCT No.: PCT/EP2013/070176
§ 371 (c)(1),
(2) Date: Mar. 27, 2015

(87) PCT Pub. No.: WO2014/049113
PCT Pub. Date: Apr. 3, 2014

(65) Prior Publication Data
US 2015/0240115 A1 Aug. 27, 2015

(30) Foreign Application Priority Data

Sep. 28, 2012 (EP) .................................... 12186613

(51) Int. Cl.
*C09D 171/02* (2006.01)
*B05D 3/06* (2006.01)
*B05D 7/02* (2006.01)
*C08J 7/12* (2006.01)

(52) U.S. Cl.
CPC ........... *C09D 171/02* (2013.01); *B05D 3/067* (2013.01); *B05D 7/02* (2013.01); *C08J 7/123* (2013.01)

(58) Field of Classification Search
CPC .......... C08J 7/123; C09D 171/02; B05D 7/02; B05D 3/067
See application file for complete search history.

(56) References Cited

U.S. PATENT DOCUMENTS 4,602,097 A 7/1986 Curtis
5,264,533 A 11/1993 Rehmer et al.
(Continued)

FOREIGN PATENT DOCUMENTS

CN 101121100 A 2/2008
DE 10149587 4/2003
(Continued)

OTHER PUBLICATIONS

Hu et al. "Surface Modification of Poly(dimethylsiloxane) Microfluidic Devices by Ultraviolet Polymer Grafting" Anal. Chem. 2002, 74, 4117-4123.*
(Continued)

*Primary Examiner* — Robert S Walters, Jr.
(74) *Attorney, Agent, or Firm* — McHale & Slavin, P.A.

(57) ABSTRACT

A single-step method for applying a coating to a polymeric substrate comprising: exposing a photoreactive compound and a polymeric compound in an aqueous solvent to ultraviolet radiation in the presence of the polymeric substrate to obtain a covalently bound coating thereon comprising a reaction product of the photoreactive compound and the polymeric compound. More particularly, a method of applying a coating to a polymeric substrate in order to reduce the adsorption of analytes in solution to the substrate by imparting properties to the substrate similar to the properties of the coating applied.

8 Claims, 13 Drawing Sheets

(56) References Cited

U.S. PATENT DOCUMENTS

| 5,863,650 | A | 1/1999 | Healy et al. |
| 7,572,489 | B2* | 8/2009 | Droschel ............... A61L 29/085 427/547 |
| 7,717,273 | B2 | 5/2010 | Kozlov et al. |
| 2009/0226629 | A1 | 9/2009 | Yen et al. |
| 2010/0049145 | A1 | 2/2010 | Nielsen et al. |
| 2010/0049146 | A1 | 2/2010 | Nielsen et al. |

FOREIGN PATENT DOCUMENTS

| EP | 0274596 | 7/1988 |
| JP | S62500307 | 2/1987 |
| JP | 2008522670 | 7/2008 |
| JP | 2010503737 | 2/2010 |
| WO | WO9000887 | 2/1990 |
| WO | WO03093329 | 11/2003 |
| WO | WO2005040294 | 5/2005 |
| WO | WO2009091224 | 7/2009 |

OTHER PUBLICATIONS

Rendl et al. "Simple One-Step Process for Immobilization of Biomolecules on Polymer Substrates Based on Surface-Attached Polymer Networks" Langmuir, Apr. 14, 2011, 27 (10) pp. 6116-6123.*

Lopergolo et al. "Direct UV photocrosslinking of poly(N-vinyl-2-pyrrolidone) (PVP) to produce hydrogels" Polymer 44 (2003) 6217-6222. (Year: 2003).*

Rishing Y., "Polymers in Pharmaceuticals", Chemical Industry Press, p. 186, last paragraph; p. 187, paragraph 1; p. 191, paragraph 2, (Aug. 31, 2003) English translation of relevant parts.

Guo, L. et al, "Automated electrophysiology in the preclinical evaluation of drugs for potential QT prolongation", Journal of Pharmacological and Toxicological Methods, vol. 52, pp. 123-135, (2005).

Shen, C. et al, "Chemical modification of polysulfone membrane by polyethylene glycol for resisting drug adsorption and self-assembly of hepatocytes", Journal of Membrane Science, vol. 369, pp. 474-481, (2011).

Silvester, S. et al, "Overcoming non-specific adsorption issues for AZD9164 in human urine samples: Consideration of bioanalytical and metabolite identification procedures", Journal of Chromatography B, Analytical technologies in the biomedical and life sciences, vols. 893-894, pp. 134-143, (2012).

Bergstrom, K. et al, "Reduction of fibrinogen adsorption on PEG-coated polystyrene surfaces", J. Biomedical Materials Research, vol. 26, pp. 779-790, (1992).

Ulbrcht, M. et al, "Photo-induced graft polymerization surface modifications for the preparation of hydrophilic and low-protein-adsorbing ultrafiltration membranes", Journal of Membrane Science, vol. 115, pp. 31-47, (1996).

Iguerb, O. et al, "Graft photopolymerization of polyethylene glycol monoacrylate (PEGA) on poly(methyl methacrylate) (PMMA) films to prevent BSA adsorption", Surf. Interface Anal., vol. 40, pp. 386-390, (2008).

DeFife, K. et al, "Effects of photochemically immobilized polymer coatings on protein adsorption, cell adhesion, and the foreign body reaction to silicone rubber", Journal of BioChemical Materials Research, 44:3:298-307, (1999).

Hoven, V. et al, "Improving blood compatibility of natural rubber by UV-induced graft polymerization of hydrophilic monomers", Journal of Applied Polymer Science, vol. 112, pp. 208-217, (2009).

Mo, Z. et al, "Effect of compound plate composition on measurement of hERG current IC50 using PatchXpress", Journal of Pharmacological and Toxicological Methods, vol. 60, pp. 39-44, (2009).

* cited by examiner

METHOD FOR APPLYING A COATING TO A POLYMERIC SUBSTRATE

CROSS REFERENCE TO RELATED APPLICATIONS

This is a national stage filing in accordance with 35 U.S.C. § 371 of PCT/EP2013/070176, filed Sep. 27, 2013, which claims the benefit of the priority of European Patent Application No. 12186613.1, filed Sep. 28, 2012 the contents of each are incorporated herein by reference.

FIELD OF THE INVENTION

The present invention relates to a method for applying a coating to a polymeric substrate in order to inhibit adsorption of analytes to said substrate. More particularly, the present invention relates to a method of applying a coating to a polymeric substrate in order to reduce the adsorption of analytes in solution to said substrate by imparting properties to the substrate similar to the properties of the coating applied.

BACKGROUND OF THE INVENTION

Many analytical systems guide the aqueous analyte of interest through channels or over surfaces made from polymeric material. Most organic analytes will adsorb non-specifically to polymer surfaces upon contact, in particular strongly hydrophobic and/or lipophilic and/or amphiphilic molecules. This may result in very substantial depletion of the analyte solution concentration before reaching the point of analysis, thus yielding grossly incorrect analysis results. The non-specific adsorption is accentuated in microfluidic systems because of the large surface-to-volume ratio. This can lead to significant underestimation of the potency of drugs in detection systems.

One example is microsystems for automated patch clamp systems where the Inhibitory Concentrations ($IC_{50}$) of a drug panel was recently reported to be >10 times too high for hydrophobic drug molecules due to analyte depletion onto polymer surfaces (Guo, L. et al., "Automated electrophysiology in the preclinical evaluation of drugs for potential QT prolongation", Journal of Pharmacological and Toxicological Methods 52 (2005), 123-135).

Different methods have been developed to limit the adsorption of analytes including surface coating or adding a surfactant to the analyte solution (Shen, C. et al., "Chemical modification of polysulfone membrane by polyethylene glycol for resisting drug adsorption and self-assembly of hepatocytes", Journal of Membrane Science (2010); Silvester, S. et al., "Overcoming non-specific adsorption issues for AZD9164 in human urine samples: consideration of bioanalytical and metabolite identification procedures", Journal of chromatography.B, Analytical technologies in the biomedical and life sciences 893-894 (2012), 134-143.). In many assays the addition of surfactant interferes with the sensitivity and can also be toxic in cellular assays.

Surface coating with polyethylene glycol (PEG) has previously been shown to significantly limit adsorption of proteins like bovine serum albumin (BSA) or fibrinogen. (Bergstrom, K. et al., Reduction of fibrinogen adsorption on PEG-coated polystyrene surfaces, *J. Biomed. Mater. Res.*, 1992, 26, 779-790).

Shen et al., supra, discloses the ability of PEG to limit adsorption of drugs at the μM level from a membrane made of polysulfone-PEG copolymer. However, the use of copolymers is not easily applied to induce low-binding on different polymer materials. Moreover, many drugs have $IC_{50}$ or Effector Concentrations ($EC_{50}$) in the nM range instead of the μM range, and the results of Shen et al. were not promising for extending the low-binding properties of hydrophobic drugs into the nM regime.

PEG coatings have previously been made via a photochemical reaction in a multistep procedure where typically first benzophenone in methanol or acetone is spin coated on the surface and thereafter a PEG monoacrylate (PEGA) is added together with UV light (Ulbricht, M. el al., "Photo-induced graft polymerization surface modifications for the preparation of hydrophilic and low-protein-adsorbing ultra-filtration membranes", Journal of Membrane Science, 115 (1996), 31-47).

Poly(methyl methacrylate) (PMMA) films have been surface-modified by grafting a solution of spin-coated macromonomer, polyethylene glycol monoacrylate (PEGA), in acetone under UV irradiation in ambient air, wherein benzophenone is used as photosensitizer to generate polymer radicals at the surface of the PMMA film (Iguerb, O. et al. "Graft photopolymerization of polyethylene glycol monoacrylate (PEGA) on poly(methyl methacrylate) (PMMA) films to prevent BSA adsorption", Surf. Interface Anal. 2008, 40, 386-390).

The above prior art methods suffer from drawbacks, including the use of low polarity organic solvents which can dissolve or swell many polymer materials, e.g. the widely used polystyrene, and undesired side reactions since carbon atoms in the organic solvent are also prone to reaction with benzophenone itself. The coating created is typically also rather thick which may be a problem in microfluidic applications. Moreover, the multistep procedure increases the complexity and cost of the coating.

Silicone rubber was coated via photochemical immobilization technology to inhibit protein adsorption, cell adhesion, and foreign body reaction to silicone rubber. Coating reagents were synthesized with 4-benzoylbenzoic acid (BBA) as the photoreactive moiety coupled to different polymers such as PEG (polyethylene glycol), mPEG-amine (methoxy PEG-amine), PAAm (polyacrylamide), PVP (polyvinylpyrrolidone), GVGVP (glycine-valine-glycine-valine-proline), CL-GVGVP (GVGVP crosslinked via gamma irradiation), and HA (hyaluronic acid) (DeFife K. M. et al., "Effects of photochemically immobilized polymer coatings on protein adsorption, cell adhesion, and the foreign body reaction to silicone rubber", Journal of Biomedical Materials Research, vol. 44, no. 3, pp 298-307, 1999).

WO 90/00887 discloses the preparation of polymeric surfaces by covalently bonding polymer molecules to the surface through external activation of latent reactive groups carried by the polymer molecules.

US2009/0226629 A1 discloses a method for fabricating a display substrate, wherein a substrate is coated with an alignment film, whereafter the alignment film is coated with a photoreactive monomer material layer and subsequently an UV light irradiation is performed selectively on the photoreactive monomer material layer in a first region.

WO 2009/091224 A2 relates to a composition for liquid crystal alignment layer, a preparation method of liquid crystal alignment using the same, and an optical film comprising the liquid crystal alignment layer.

WO 2005/040294 A1 relates to an organosilane-based composition for producing a barrier layer for gases, comprising (i) at least one organoalkoxysilane, (ii) at least one aminoalkylalkoxysilane, (iii) at least one polyol, (iv) optionally, another alkoxysilane or alkoxysiloxane, and (v) optionally, at least one nano- or microscale semimetal oxide or metal oxide, semimetal oxide hydroxide or metal oxide hydroxide, or semimetal hydroxide or metal hydroxide and/or (vi) at least one cocondensate, and/or (vii) reaction products produced under hydrolysis conditions, and (viii) an organic solvent.

WO 03/093329 A1 relates to a multi-coating system with gas-barrier properties that is able to undergo crosslinking by means of UV radiation and is said to be particularly suitable for the external protection of containers made of thermoplastic polymers.

DE 101 49 587 B4 relates to a photoreactive coated composite membrane based on a separately prepared matrix membrane, the surface of which is functionalized, wherein a reaction mixture containing at least one functionalising monomer is used to form two different polymer layer structures using two different reaction conditions.

EP 0 274 596 A2 relates to an ultraviolet radiation curable coating composition for plastic substrates comprised of: (i) at least one polyfunctional acrylate monomer; (ii) at least one acetophenone photoinitiator; and (iii) at least one active ultraviolet radiation adsorber selected from benzotriazoles, cyanoacrylates, and hydroxybenzophenones or mixtures thereof.

However, there is still a need for a simple method of coating a polymeric substrate which results in a thin coating and which may be performed in one step without the use of organic solvents in either open or closed volumes (e.g. channel systems), and with the ability to pattern the coated layer on macroscopic and microscopic length scales.

OBJECT OF THE INVENTION

It is an object of embodiments of the invention to provide a method for applying a coating to a polymeric substrate which coating efficiently inhibit adsorption of analytes, in particular hydrophobic and/or lipophilic and/or amphiphilic molecules, and which coating may be applied to a polymeric substrate via a simple and reliable method.

SUMMARY OF THE INVENTION

It has been found by the present inventors that it is possible to provide a low adsorption coating to a polymeric substrate by a single-step method without the use of organic solvents.

So, in a first aspect the present invention relates to a single-step method for applying a coating to a polymeric substrate comprising:

Exposing a photoreactive compound and a polymeric compound dissolved in an aqueous solvent to ultraviolet radiation in the presence of said polymeric substrate to obtain a covalently bound coating thereon comprising a reaction product of the photoreactive compound and the polymeric compound.

In another aspect the present invention relates to a coating suitable for covalent bonding to a polymeric substrate obtainable by the method according to the invention.

In another aspect the present invention relates to a use of the coating according to the invention for decreasing the adsorption of an analyte in solution to a polymeric substrate.

LEGENDS TO THE FIGURE

Figure 9:
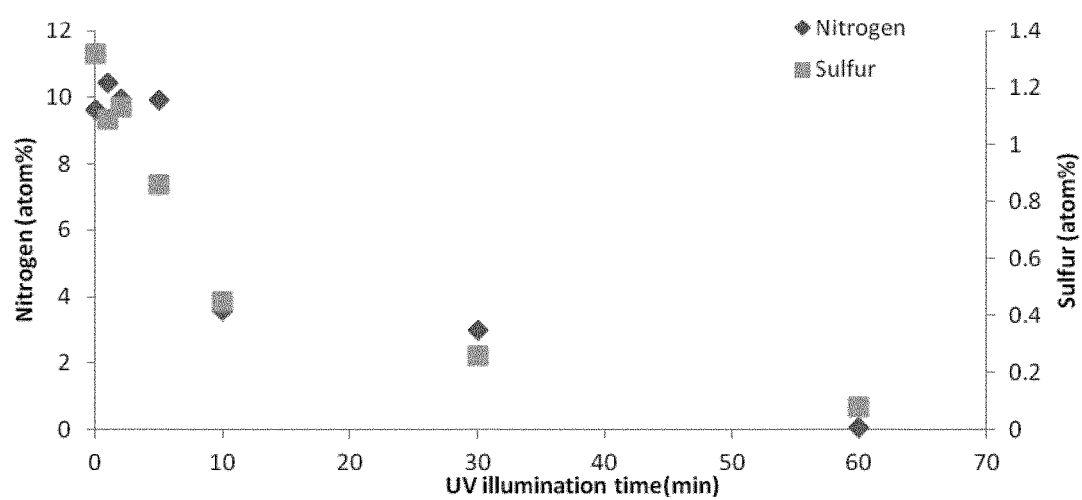
Figure 10:
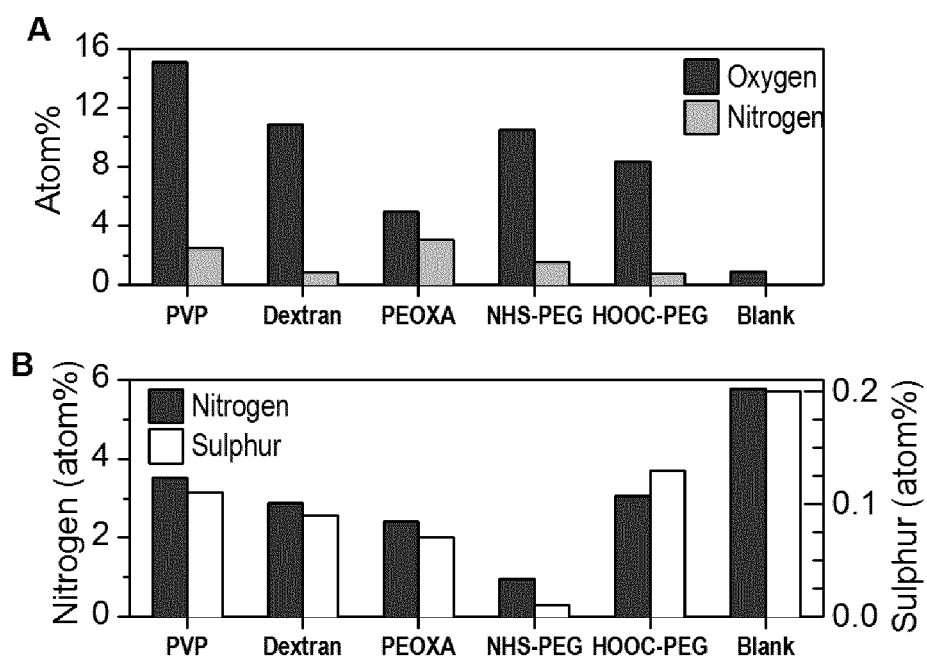

FIG. 9 shows adsorption of IgG (0.1 mg/mL; 4 hours) as a function of UV illumination time using 10 mM Bz and 10 mM NHS-PEG; and FIG. 10 shows (A) XPS analysis of modified polystyrene substrates after UV illumination for 30 minutes; (B) XPS analysis of the modified polystyrene substrates after incubation with BSA (0.1 mg/mL, 4 hours).

Figure 11:
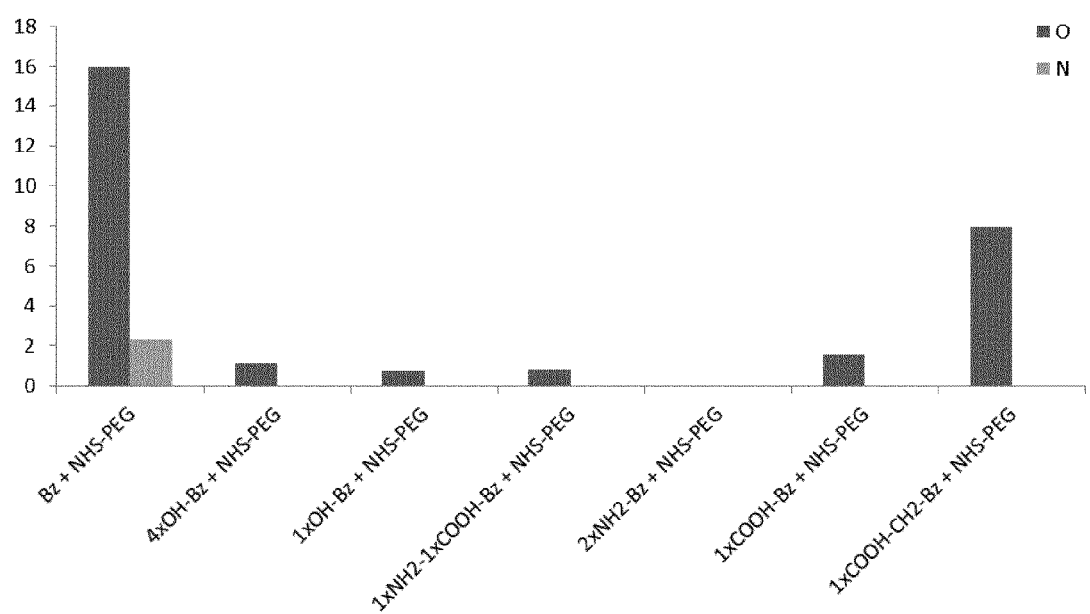

FIG. 11 shows XPS analysis of polystyrene substrates modified with different types of benzophenone together with NHS-PEG (7.5 mg/ml) after UV illumination for 60 minutes.

Figure 12:
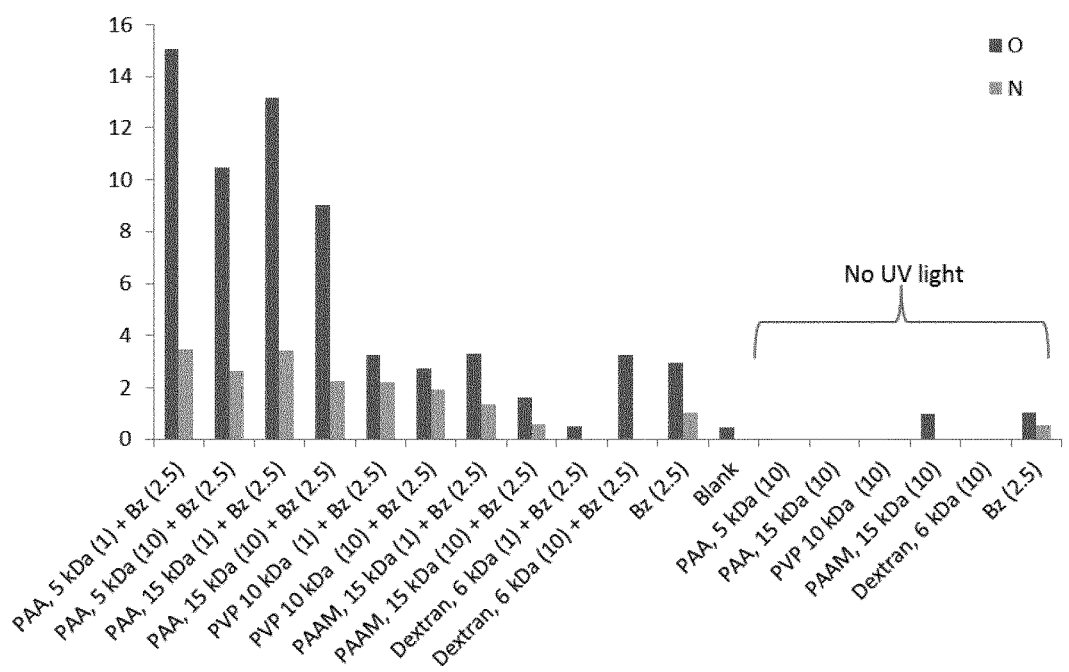

FIG. 12 shows XPS analysis of polystyrene substrates modified with benzophenone together with different polymers after UV illumination for 30 minutes in aqueous buffer. The number in parentheses specifies concentration in mg/ml.

Figure 13:
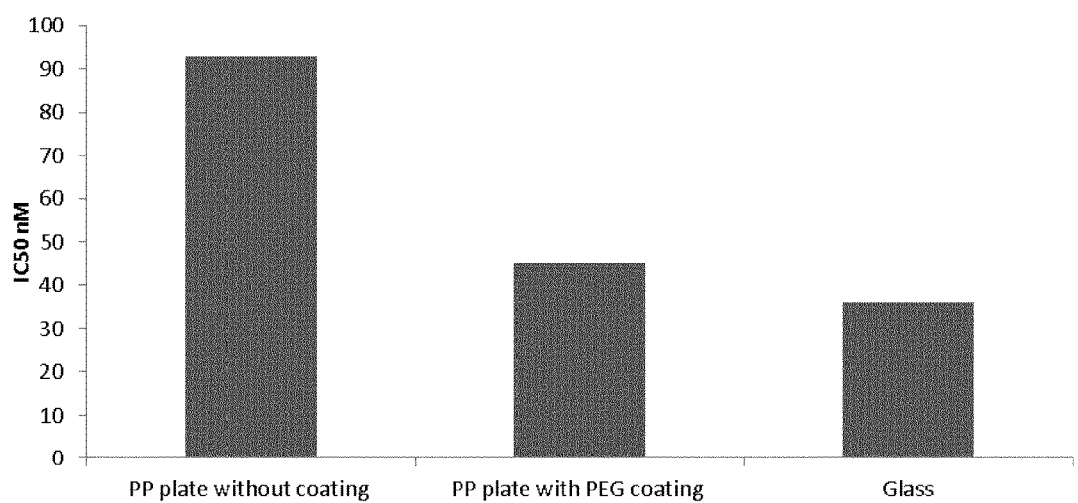

FIG. 13 shows IC50 value of astemizole after 1 hour of storage in polypropylene plates without a coating, with a PEG coating, og with a glass coating.

DETAILED DISCLOSURE OF THE INVENTION

Definitions

In the present context the term "photoreactive compound" means a compound which by the addition of electromagnetic radiation, such as ultraviolet radiation, is made reactive.

In the present context the term "water-soluble compound" means a compound having a solubility in water of at least 10 g/L, such as at least 20 g/L, more preferred at least 30 g/L.

In the present context the term "analyte" means any compound or molecule in solution, whose presence is to be analysed. Non-limiting examples of analytes include small-molecule drugs, peptides, proteins, DNA, RNA, and antibodies.

In the present context the term "derivative", such as "benzophenone derivative" means a compound having the backbone of the parent compound, but having one or more substituents.

Specific Embodiments of the Invention

In an embodiment of the invention said photoreactive compound is a water-soluble compound comprising a functional moiety capable of reacting with said polymeric compound and a latent functional group capable of covalent bond formation to said substrate in response to ultraviolet radiation.

In an embodiment of the invention said functional moiety of said photoreactive compound is a moiety selected from the group consisting of —$(CH_2)_{0-4}$—NHR, —$(CH_2)_{0-4}$—COOR, and —$(CH_2)_{0-4}$—O—$(CH_2)_{0-4}$—R, wherein R is H or $C_{1-4}$-alkyl.

In an embodiment of the invention said latent functional group of said photoreactive compound capable of covalent bond formation is selected from the group consisting of phenyl-C(=O)—, quinoid C=O, and thioxanthene C=O.

Thus it has been found that said functional moiety enhances the solubility of the photoreactive compound in aqueous media in addition to facilitating the formation of a covalent bond betwen said photoreactive compound and said polymeric compound. Said latent functional group has been found to form covalent bonds with a number of different polymeric substrates.

In an embodiment of the invention said photoreactive compound is an aromatic ketone selected from the group consisting of a benzophenone derivative, an acetophenone derivative, an anthraquinone derivative, a thioxanthone derivative, and a ketocoumarin derivative.

In an embodiment of the invention said photoreactive compound is selected from the group consisting of 4-benzoyl benzylamine, 2-aminobenzophenone, 3-aminobenzophenone, 4-aminobenzophenone, 3,4-diaminobenzophenone, 4,4'-diaminobenzophenone, 2-benzoyl benzoic acid, 4-benzoyl benzoic acid, 2-aminoacetophenone, 2'-aminoacetophenone, 2-aminobenzophenone-2'-carboxylic acid, 4-hydroxybenzophenone, 2,2',4,4'-tetrahydroxybenzophenone, 2-acetylbenzoic acid, 4-acetylbenzoic acid, 2-(3-benzoylphenyl)propionic acid, anthraquinone-2-carboxylic acid, 1-aminoanthraquinone, 1,4-diaminoanthraquinone, 2-amino-7-methyl-9H-thioxanthen-9-one, 2-carboxy-9H-thioxanthene-9-one, and 2-(3-sulfopropoxy)-9H-thioxanthene-9-one or an inorganic or organic salt thereof, preferably 4-benzoyl benzylamine or 4-benzoyl benzylamine hydrochloride.

Thus it has turned out that the above compounds possess an advantageous solubility in aqueous media and allow the formation of a covalent bond to the polymeric compound. In particular it has turned out that 4-benzoyl benzylamine has a high solubility in aqueous media, and that the amine functionality of 4-benzoyl benzylamine permits covalent bonding of said photoreactive compound to the polymeric compound.

In an embodiment of the invention said polymeric compound is a polymer containing hydrogen bound to carbon and having a functional moiety capable of reacting with said functional moiety of the photoreactive compound.

In an embodiment of the invention said polymeric compound is selected from the group consisting of polyethylene glycol (PEG) compound, poly(vinyl pyrrolidone) (PVP,), polyacrylic acid (PAA), polyacrylamide (PAAM), dextran, and a poly(oxazoline) compound, as well as esters, amines, acids, succinimidyl-modified acids, maleimides, biotinylated esters, biotinylated amines, biotinylated acids, and biotinylated maleimides thereof.

In an embodiment of the invention said polymeric compound is selected from the group consisting of
OMe-PEG-NHS (alpha-Methoxy-omega-carboxylic acid succinimidyl ester poly(ethylene glycol)), OPSS-PEG-NHS (alpha-[3-(o-Pyridyldisulfido)propanoylamido]-omega-carboxylic acid succinimidyl ester poly(ethylene glycol)), and
Biotin-PEG-NHS (alpha-Biotin-omega-carboxylic acid succinimidyl ester poly(ethylene glycol)), preferably OMe-PEG-NHS.

Thus it has turned out that reactivity of a PEG compound to a polymeric substrate is increased by having a specific amino-reactive group, such as an NHS ester, at the end of a PEG chain compared to e.g. amine-PEG.

In an embodiment of the invention said solvent is selected from the group consisting of water, an aqueous solution of one or more inorganic or organic salts, an aqueous solution of an inorganic acid, and ammonia.

In an embodiment of the invention the solvent is an aqueous solution of at least one salt selected from the group consisting of sodium carbonate, sodium hydrogen phosphate, potassium hydrogen phosphate, sodium chloride, and potassium chloride, preferably Phosphate Buffered Saline (PBS).

In an embodiment of the invention the ultraviolet radiation used for exposure has a wavelength range from 250-400 nm, preferably 330-380 nm, such as 360-370 nm.

In an embodiment of the invention the exposure to ultraviolet radiation is performed at a radiation dose in the range 1-300 $J/cm^2$, preferably in the range 10-200 $J/cm^2$, such as in the range 20-100 $J/cm^2$.

The radiation dose may result from exposure to ultraviolet radiation at a lower radiation rate for a longer time, such as 10 $mW/cm^2$ for 30 minutes to produce a radiation dose of 18 $i/cm^2$ in one embodiment of the invention, or a higher radiation rate for shorter time, such as 200 $W/cm^2$ for 1 second to produce a radiation dose of 200 $J/cm^2$ in another embodiment of the invention. Thus the radiation rate and the time of exposure to ultraviolet radiation may vary depending on the specific circumstances, but generally a radiation dose as indicated above is sufficient to obtain satisfactory binding to a polymeric substrate.

In an embodiment of the invention the concentration of the photoreactive compound in the aqueous solvent is in the range 2-50 mM, preferably in the range 5-20 mM, such as 10-15 mM.

In an embodiment of the invention the concentration of the polymeric compound in the aqueous solvent is in the range 0.5-50 mM, preferably in the range 1-15 mM, such as 2-10 mM.

In an embodiment of the invention the polymeric substrate comprises a material selected from the group consisting of polystyrene (PS), Liquid Crystal Polymer (LCP), polyimide (PI), cyclic olefin copolymer (COC), poly(methyl methacrylate) (PMMA), poly(dimethyl siloxane) (PDMS), epoxy, poly(caprolactone) (PCL), polycarbonate (PC), polypropylene (PP), polyethylene (PE), poly(oxymethylene) (POM), polyamides (PA), polyesters, polyurethane (PUR), poly(ethylene oxide) (PEO), polyisoprene, poly(butadiene), poly(lactic acid) (PLA), poly(glycolic acid) (PGA), poly (vinyl pyrrolidone), hyaluronic acid (HA), heparin, alginate, agarose, collagen, gelatin, and copolymers and blends and cross-linked materials thereof, preferably polystyrene.

An embodiment of the invention is a method for applying a coating on a polymeric substrate comprising: Reacting a photoreactive compound and a polymeric compound in an aqueous solvent to obtain a reaction product of the photoreactive compound and the polymeric compound, and exposing said reaction product to UV radiation in the presence of said substrate to obtain a covalently bound coating thereon.

In an embodiment of the invention the use according to the invention is for limiting adsorption of hydrophobic and/or lipophilic and/or amphiphilic molecules to a polymeric substrate.

In an embodiment of the invention the amount of a molecular species in solution adsorbed to a polymeric substrate with said coating is reduced to less than 50% of the amount adsorbed to said polymeric substrate without said coating, such as less than 40%, 30%, 20%, and 10%, preferably less than 5% of the amount adsorbed on said polymeric substrate without said coating.

The invention is illustrated in more detail by way of the following non-limiting examples.

Materials and Methods

Polystyrene (PS, BASF grade 158K) was used in the shape of Ø5 cm petri dishes acquired from Nunc (Denmark). Cyclic olefin copolymer (COC) foil of grade 6013 was obtained from Topas Advanced Polymers (Germany). Liquid crystal polymer (LCP) foil of grade ULTRALAM 3000 was from Rogers Corporation (AZ). 4-benzoyl benzylamine hydrochloride (Bz) was obtained from Fluorochem (UK). N-(3-Dimethylaminopropyl)-N'-ethylcarbodiimide hydrochloride (EDC), methanol (MeOH), acetic acid, terfenadine, astemizole, dofetilide, amiodarone, sotalol, Bovine Serum Albumin (BSA), non-specific human IgG, human insulin, DNA sodium salt from salmon testes, Phosphate Buffered Saline (PBS), HO-PEG-OMe (750 Da, PEG), dextran (6 kDa), poly(vinyl pyrrolidone) (10 kDa, PVP), and poly(2-ethyl-2-oxazoline) (5 kDa, PEOXA) were obtained from Sigma Aldrich. OMe-PEG-NHS (750 Da, PEG1166.0001, NHS-PEG) was obtained from Iris biotech (Germany). YMC pack 5 μm diol HPLC column (8×500 mm) with 6 nm pore size was obtained from Mikrolab Aarhus (Denmark). X-ray photoelectron spectroscopy (XPS) was performed on a K-Alpha spectrometer (Thermo Fisher Scientific, UK) using a 400-μm wide monochromatized AlKa X-ray spot with collection of the emitted photoelectrons at a pass energy of 200 eV or 50 eV for survey or high resolution spectra, respectively.

Electrospray ionization mass spectroscopy (ESI-MS) proceeded using an Agilent 6100 Series Single Quad LC/MS System.

Contact angles were determined using a dataphysics OCA 20 goniometer (Germany) running the manufacturer's SCA-20 software package. Static, advancing and receding contact angles were measured after applying a drop of 5 μL of water onto the surface.

General Procedure for the Coating of Polymer Surfaces

Coating of Polymer Surfaces

NHS-PEG, Bz-PEG, PEG and Bz were dissolved in PBS in concentrations up to 50 mM, while dextran, PVP, and PEOXA were dissolved in PBS at a fixed concentration of 7.5 mg/mL together with Bz at a concentration of 2.5 mg/mL. The reactant solution was added onto the polymer film in a polystyrene container, and the surface was exposed to UV light using a custom built photoreactor with a broad illumination maximum from 330-380 nm (Philips Cleo S-R 80 fluorescent tubes) at an intensity of 18 mW/cm2. The exposed samples were flushed 3 times with water and ethanol.

Adsorption of BSA, insulin, IgG, or DNA

BSA, insulin, IgG, and DNA were each dissolved in PBS at concentrations up to 1 mg/mL and added to a polystyrene container. Samples of coated or un-coated film had a mass density smaller than water's and were exposed to the test solutions by floating on the aqueous phase with their coated side facing the solution. Incubation proceeded for 4 hours at room temperature. The samples were carefully rinsed with water five times and then dried before quantitating the adsorbed amount by XPS analysis.

Adsorption of Drugs

Different concentrations of the drugs were dissolved in 2 ml $H_2O$ from a stock solution of 0.5 mM in 50% acetonitrile/50% $H_2O$, and added to coated or uncoated polystyrene containers (2 mL solution added to each circular container of diameter 33 mm) as well as glass containers acting as reference material. Drug concentrations up to 250 nM were investigated. At different time points 250 μL of supernatant was sampled for analysis. Each sample was mixed with 250 μL 99.8% MeOH/0.2% acetic acid containing 200 nM of sotalol or dofetilide as an internal standard. The samples were analyzed by ESI-MS using 50% $H_2O$/50% MeOH/0.1% acetic acid running buffer (0.1 mL/min).

Preparation Example 1

Conjugation of NHS-PEG to Benzophenone

Bz-PEG was synthesized by adding NHS-PEG (126 mg, 151 μmol), Bz (35 mg, 141 μmol) and EDC-HCl (138 mg, 720 μmol) 60 to 0.5 ml PBS and reacting for 24 hours at room temperature. The product were purified by HPLC using a 5 μm diol column with 6 nm pore size and using a running buffer (1 mL/min) of 50% MeOH/50% $H_2O$ with 50 mM NaCl. The purified product was collected and solvent evaporated, before dissolving in 1 mL $H_2O$. The concentration of Bz-PEG was determined from a 1 μL sample dissolved in 99 μL $H_2O$ and injected onto the HPLC.

Example 1

Surface coating was performed in a one-step process where benzophenone amine (Bz) and NHS-PEG (750 Da) in PBS was added to different polymer surfaces before UV light illumination (Scheme 1; labelled "Bz+NHS-PEG" in the figures).

Scheme 1

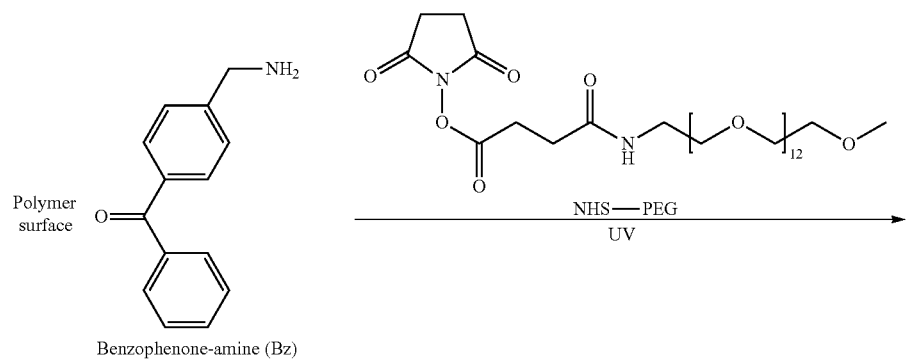

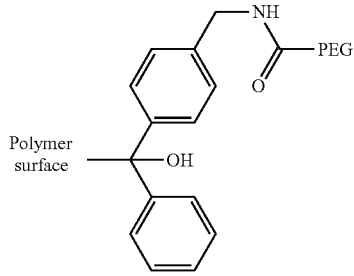

Figure 1:
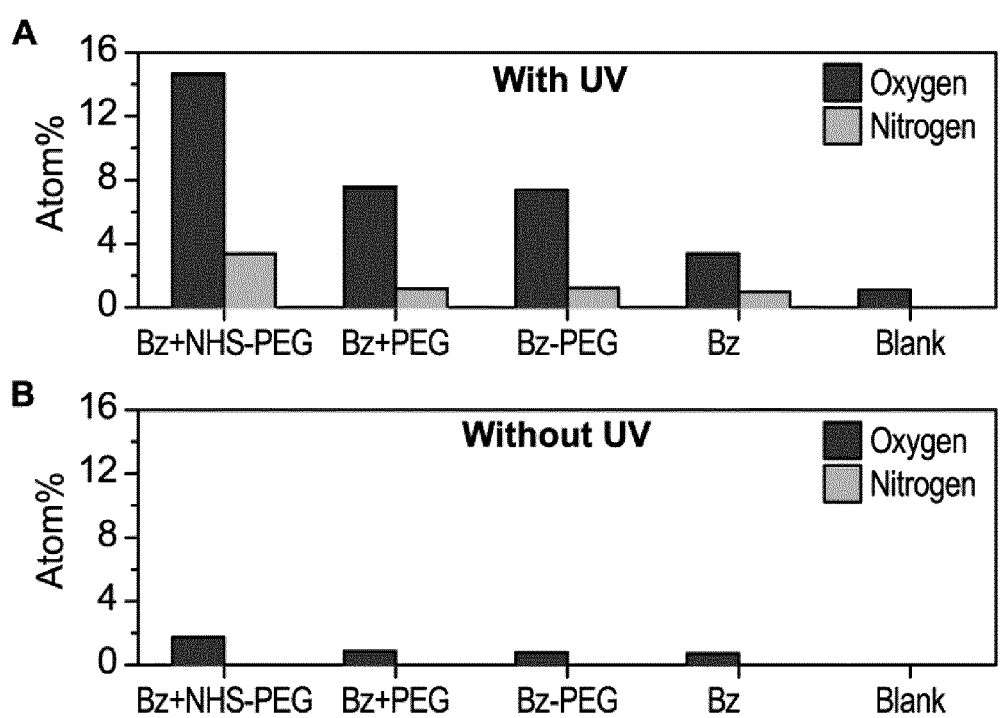
FIG. 1 shows XPS surface analysis of modified polystyrene (A) with or (B) without UV illumination for 30 minutes.

The significance of coupling via the activated NHS ester group was investigated in a separate set of experiments using Bz and an equally sized PEG without a terminal NHS ester (labelled "Bz+PEG" in the figures). A two-step method was also explored where Bz and NHS-PEG are first covalently coupled via an amide link to form Bz-PEG. The Bz-PEG product was purified by HPLC and then added to the different polymer surfaces before UV light illumination (labelled "Bz-PEG"). Surface coating by both methods have the advantage of being performed in an aqueous buffer instead of the usually used organic solvent, which can react with the photoactivated benzophenone. Moreover the actual photoactivated coating is performed in a single step. The results labelled "Bz" denote reaction of dissolved benzophenone only. All compounds were dissolved in PBS at 10 mM concentration. "Blank" was treated in pure PBS. Polystyrene surfaces were treated using the set of different procedures and with or without photoactivation by UV illumination. The samples were washed thoroughly after reaction to remove any physically adsorbed reagents. XPS analysis on the dried samples showed a large concentration increase of both oxygen (14.7 atom %) and nitrogen (3.4 atom %) on the Bz+NHS-PEG sample (FIG. 1A) compared to controls without UV light (FIG. 1B). Photoactivated coating by Bz without PEG resulted in much lower amounts of oxygen (3.4 atom %) and nitrogen (1.0 atom %). This strongly suggests that NHS-PEG was coupled to the surface in a process involving photoactivated Bz. The Bz+PEG and Bz-PEG samples also showed an increase in oxygen concentration (7.6 atom % and 7.3 atom %, respectively), indicating that PEG was also attached on these samples but to a smaller extent. All controls without UV illumination had very low surface concentrations of oxygen and nitrogen, showing that photoactivation is required for modifying the polystyrene surface.

Example 2

Figure 2:
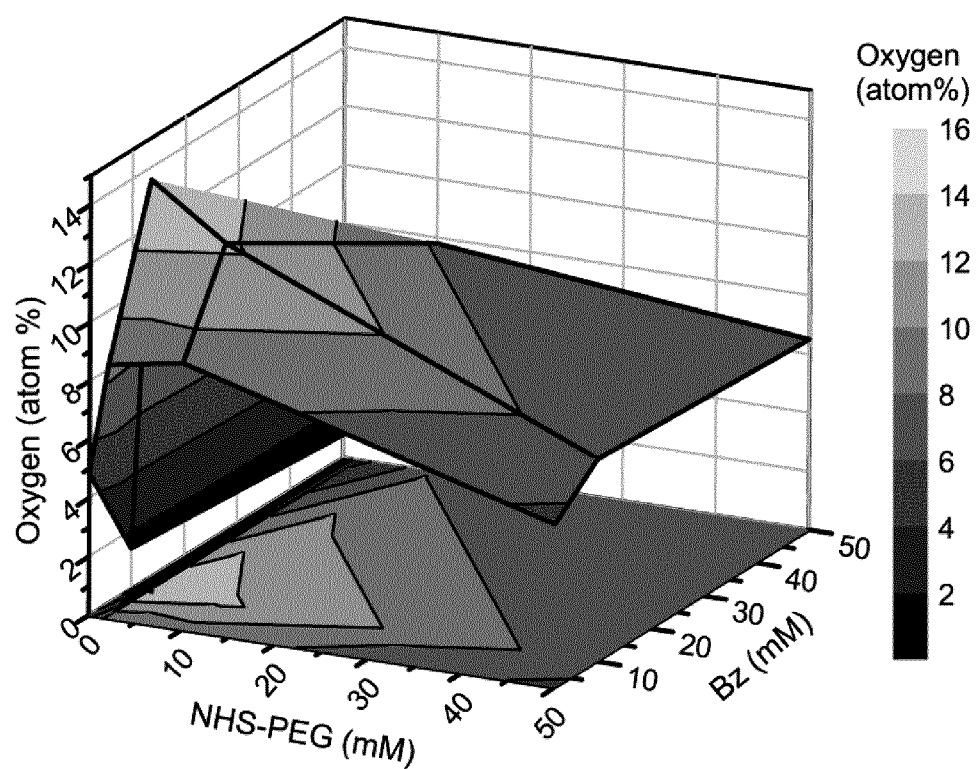
FIG. 2 shows XPS analysis of the oxygen concentration on treated polystyrene surfaces after photoactivated reaction for 30 min using all combinations of Bz and NHS-PEG in concentrations of 0, 2, 10 or 50 mM.

The influence of the Bz and NHS-PEG concentrations on the degree of reaction was examined by varying the two concentrations from 0 to 50 mM with UV illumination for 30 minutes (FIG. 2). A maximum oxygen concentration of 14 atom % was measured on the sample treated with 10 mM Bz and 2 Mm NHS-PEG.

Example 3

Figure 3:
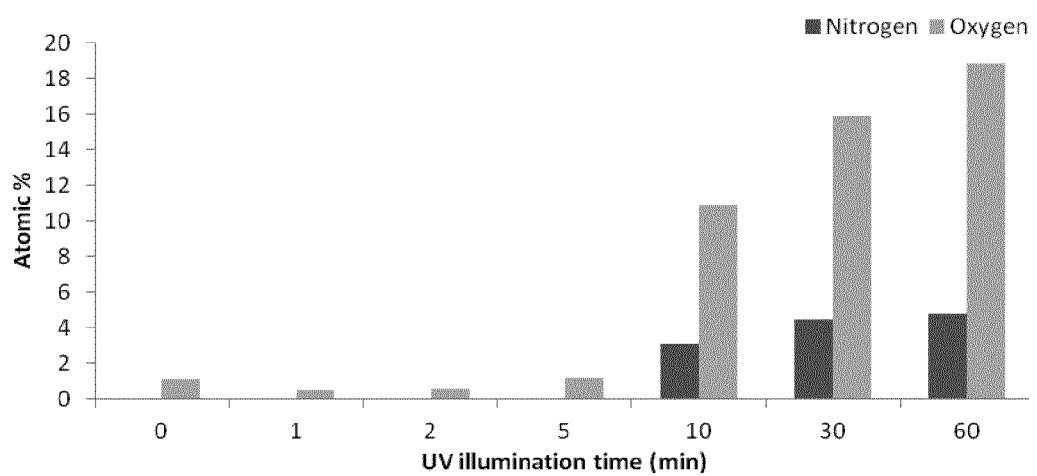
FIG. 3 shows XPS analysis of the nitrogen and oxygen surface concentrations as a function of UV illumination time using 10 mM Bz and 10 mM NHS-PEG in PBS.

The influence of UV illumination time was also examined for the Bz+NHS-PEG reaction (FIG. 3). Oxygen and nitrogen surface concentrations increased with illumination time up to 60 minutes (18.9 atom % oxygen and 4.8 atom % nitrogen), which was the longest time investigated.

Example 4

Adsorption of Drugs
The effectiveness of the low-binding Bz+NHS-PEG coatings were probed by extended incubation of coated and uncoated polystyrene in 100 nM solutions of drugs spanning a wide range of hydrophobicity. Glass surfaces were included as reference to the polystyrene. The supernanants of the incubation solutions were sampled at different time points, and the drug concentrations determined by electrospray ionization mass spectrometry (ESI-MS) after addition of an internal standard.

Figure 4:
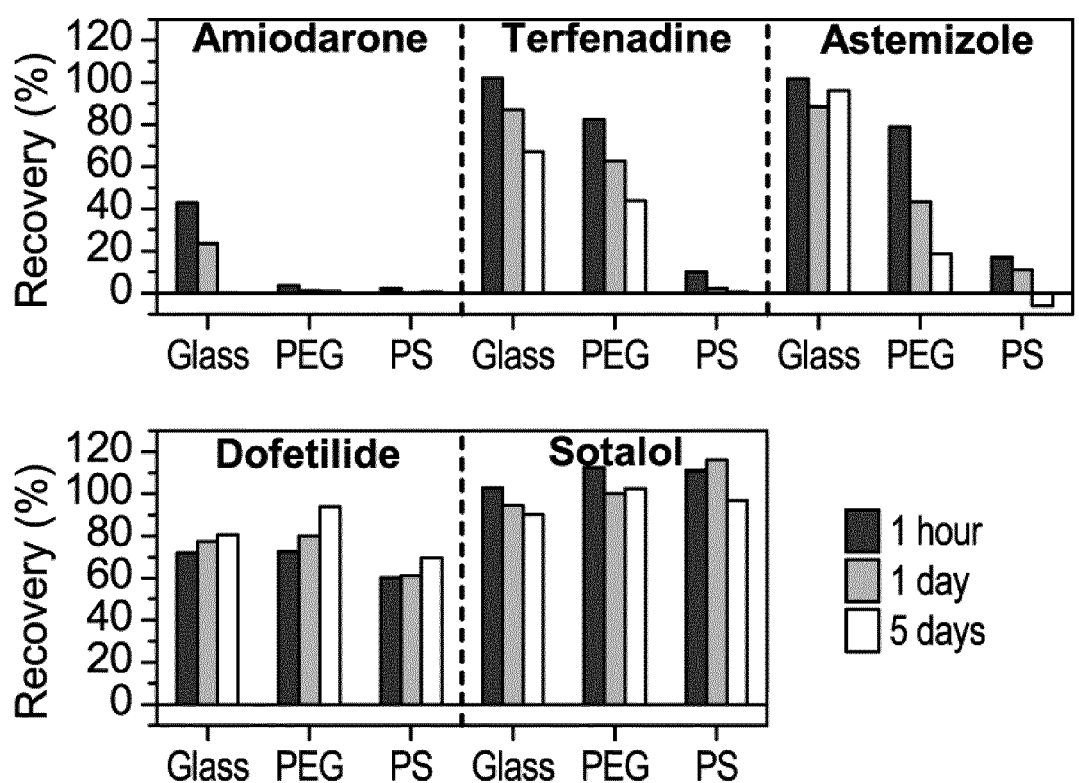
FIG. 4 shows incubation of 100 nM drug solutions on glass, Bz+NHS-PEG coated polystyrene, or untreated polystyrene.

The recovery was calculated as the ratio of the drug concentration in the supernatant to the initially added drug concentration. Polystyrene surfaces modified by Bz+NHS-PEG (10 mM of each compound) showed a much larger recovery than unmodified polystyrene for even the most hydrophobic drugs (amiodarone, terfenadine, and astemizole with c Log P=8.95, 6.5, and 5.7, respectively) (FIG. 4). The more hydrophilic drugs dofetilide and sotalol (c Log P=1.99 and 0.23 respectively) exhibited large recovery on all surfaces.

Figure 5:
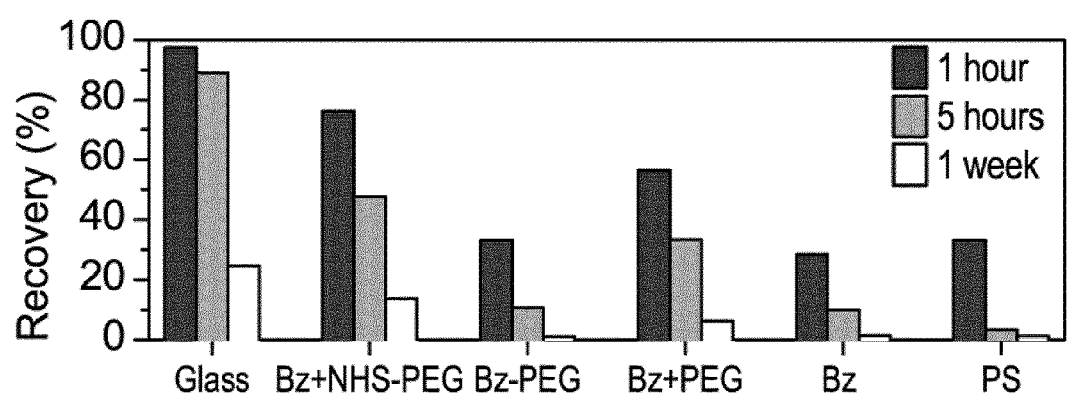
FIG. 5 shows incubation of 100 nM amiodarone on modified polystyrene as well as unmodified glass and polystyrene.

The most hydrophobic drug, amiodarone, showed large adsorption even on the glass surface. However, in FIG. 4 glass vials were used for storage of the sampled supernatants for up to 3 days before performing the actual drug measurement. Thus the results likely overestimate the amount adsorbed on the test surfaces due to later adsorption to the storage glass vials. Another series of experiments used amiodarone as a sensitive assay for the low binding quality of the different surface coating methods and minimized the problem of adsorption in the glass vials by measuring the drug concentration within one hour after sampling (FIG. 5). Glass showed the least drug adsorption as expected. However, polystyrene coated with Bz+NHS-PEG also showed a large recovery of 76% after 1 hour, 50% after 5 hours, and 13% after 1 week, the latter being comparable to glass. In comparison, less than 3% of the initial amiodarone remained in solution after 5 hours on the uncoated polystyrene.

Figure 6:
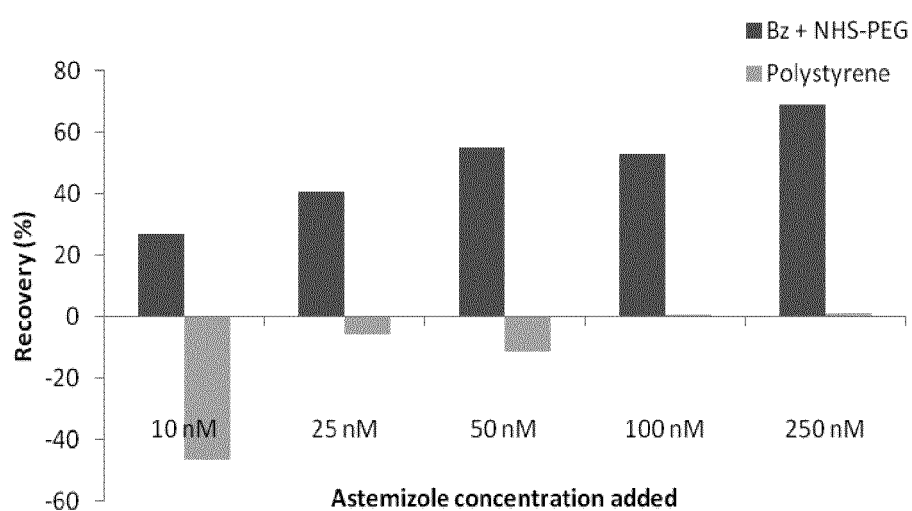
FIG. 6 shows adsorption of astemizole for 3 days on polystyrene surface modified with 10 mM Bz+10 mM NHS-PEG.

Incubation of Bz+NHS-PEG coated polystyrene for 3 days with the less hydrophobic astemizole in concentrations from 10 nM to 250 nM showed >20% recovery even at the lowest concentration and increasing recovery for higher drug concentrations (FIG. 6). In contrast, uncoated polystyrene showed close to zero recovery for all drug concentrations tested.

Example 5

Figure 7:
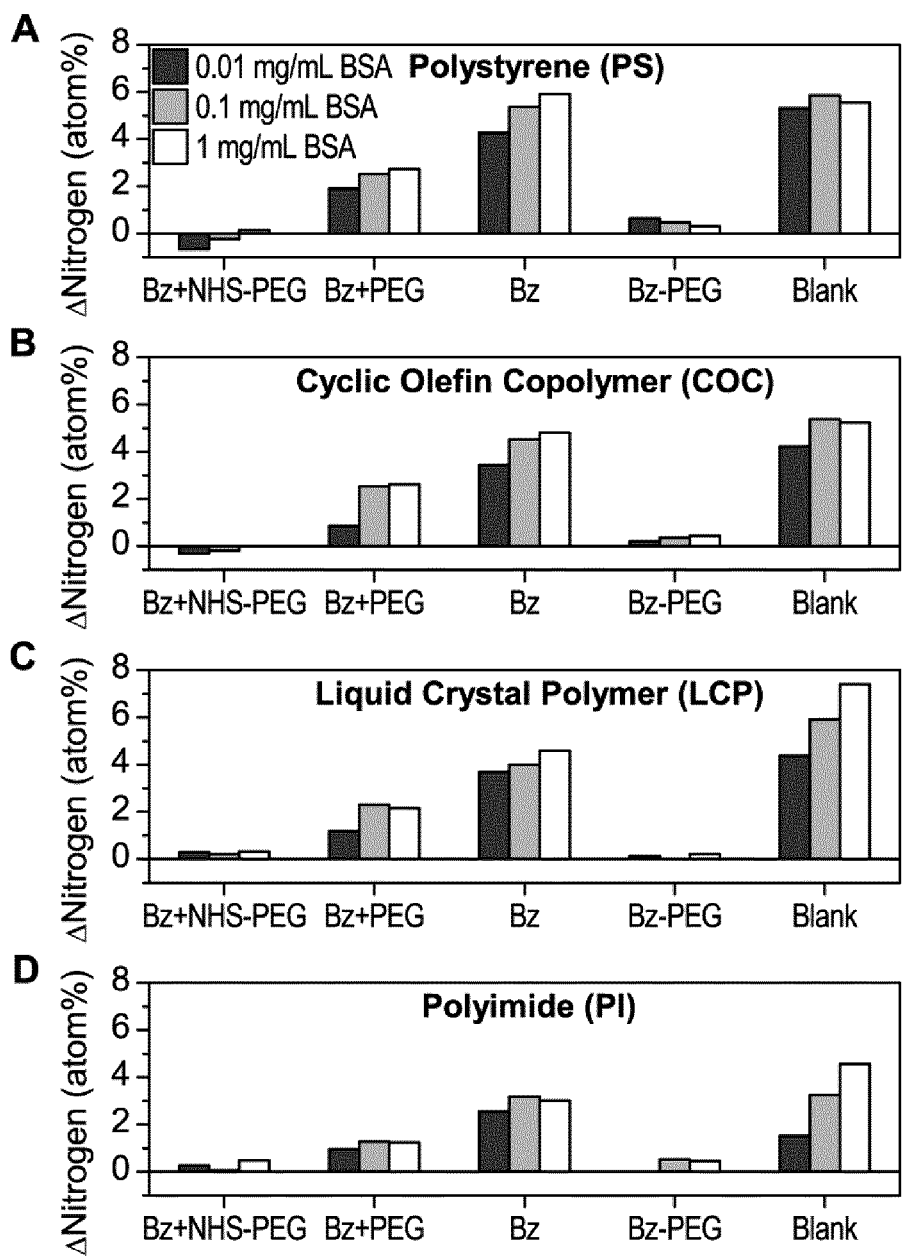
FIG. 7 shows XPS analysis of protein (BSA) adsorption on different polymer types before and after incubation with nitrogen-containing BSA for 4 hours.

The effectiveness of a Bz+NHS-PEG coating in reducing protein adsorption on a broad range of polymers relevant to microanalytical systems, including polystyrene, cyclic olefin copolymer, liquid crystal polymer, and polyimide, was tested. Modified and unmodified polymer surfaces were incubated with solutions of 0-1 mg/mL bovine serum albumin (BSA) in PBS for 4 hours. After carefully washing, the incubated surfaces were analyzed by XPS (FIG. 7).

The difference in nitrogen surface concentration before and after incubation with BSA was taken as a measure of the amount of adsorbed protein, with the caveat that polyimide contains nitrogen in its molecular structure. After BSA adsorption a large increase in nitrogen (up to 7 atom %) was observed on the uncoated sample as well as the Bz coated samples for all tested polymer materials. In contrast, polymer surfaces modified using Bz+NHS-PEG or Bz-PEG showed a minute increase in nitrogen concentration (<0.6 atom %), indicating a low adsorption of BSA on these PEG coated samples. Polymer surfaces treated with Bz+PEG showed inferior low protein binding properties to materials modified with Bz+NHS-PEG, as revealed by higher surface nitrogen concentrations on all polymer materials after incubation with BSA.

Example 6

Figure 8:
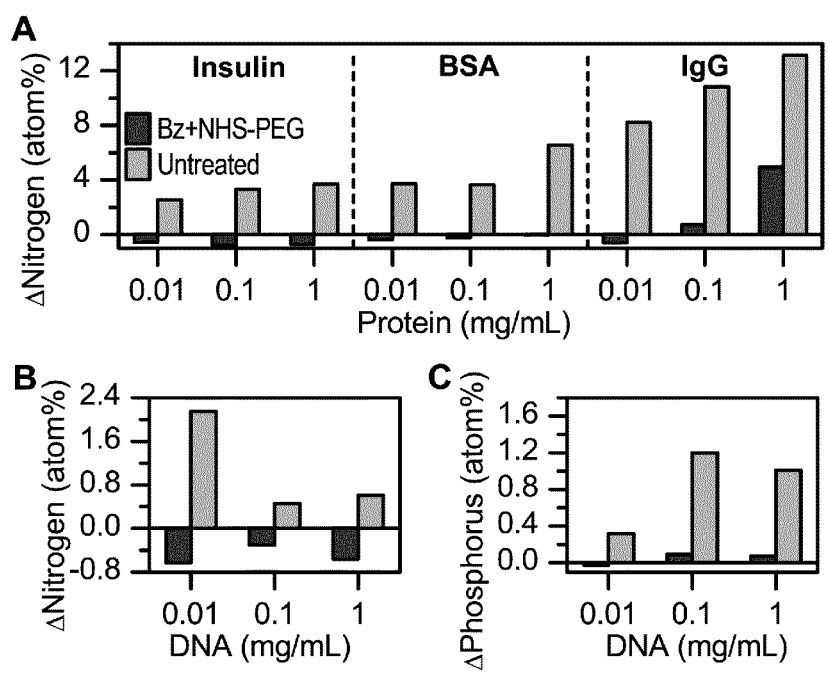
FIG. 8 shows XPS analysis of (A) adsorption of small to large proteins and (B)+(C) DNA at varying concentrations on modified or unmodified polystyrene for 4 hours, wherein the adsorbed amount is determined as the surface concentration of nitrogen (for proteins) or nitrogen and phosphorus (for DNA)

Adsorption of different types of proteins spanning a large range of molecular weights was analyzed on Bz+NHS-PEG coated or uncoated polystyrene surfaces (FIG. 8A). Coating of the surface strongly limited adsorption of a small and a medium sized protein (insulin and BSA, respectively). For a large protein (IgG), the same effect was observed for concentrations up to 0.1 mg/mL and to lesser extent for the highest tested IgG concentration of 1 mg/mL.

Example 7

DNA has been shown to adsorb onto many different material surfaces. The ability of the Bz+NHS-PEG coating to reduce DNA adsorption after incubation with DNA from salmon testes at concentrations up to 1 mg/mL was tested on a polystyrene surface. Adsorption will give rise to increased surface concentrations of nitrogen from the nucleotides and increased phosphorus from the DNA backbone as shown in FIG. 8B and FIG. 8C, respectively. The phosphorus signal is seen to be a much more consistent marker for the amount of adsorbed DNA. For the two highest concentrations tested (1 mg/mL and 0.1 mg/mL) there was a large adsorption on the polystyrene surface with more than 1 atom % phosphorus, while incubation with 0.01 mg/mL DNA resulted in 0.3 atom % phosphorus (FIG. 8C). In contrast, DNA solutions incubated on polystyrene coated by Bz+NHS-PEG resulted in very low phosphorus concentrations (<0.1 atom %) near the detection limit. Thus, adsorption of DNA is strongly reduced after surface modification.

Example 8

The density and thickness of the final PEG coating can be controlled by the illumination time in the UV reactor, as shown in FIG. 3. Samples prepared with different illumination times were incubated with 0.1 mg/mL IgG in PBS for 4 hours, and the amount of adsorbed protein was analyzed using XPS to probe the nitrogen and sulfur surface concentrations (FIG. 9). Protein adsorption was high on samples prepared by UV illumination for min while illumination times for more than 10 min resulted in decreasing protein adsorption with increasing illumination time. The lowest nitrogen and sulfur concentrations of 0.08 atom % and 0.07 atom %, respectively, were observed for the longest illumination time tested of 60 min. This indicates that the UV illumination time, and probably also the UV dose, is an important parameter for controlling the amount of PEG coating and thereby the low binding quality of the surface.

Example 9

Dextran, PVP, and PEOXA can be used instead of PEG for reducing the protein adsorption to polymer surfaces. Polystyrene substrates were surface modified by UV illumination for 30 minutes using a solution of Bz with either dextran, PVP, or PEOXA. The resulting surfaces were analyzed by XPS to reveal an increased surface concentration of both oxygen and nitrogen over the control sample (FIG. 10A). Subsequent incubation with 0.1 mg/mL BSA for 4 hours showed reduced protein adsorption on all modified substrates compared to the control sample (FIG. 10B).

Example 10

Polystyrene substrates were surface modified with either a PEG with an amine-reactive functional moiety, a carboxylic acid succinimidyl ester (NHS-PEG), or an equivalent PEG with a less amine-reactive functional moiety, an unmodified carboxylic acid (HOOC-PEG). XPS analysis of the modified substrates showed a higher oxygen concentration (FIG. 10A) on the NHS-PEG modified surface (10.5 atom %) than on the HOOC-PEG modified surface (8.3 atom %) indicative of a more dense surface coating. Subsequent incubation with 0.1 mg/mL BSA for 4 hours showed much lower protein adsorption (FIG. 10B) on the NHS-PEG coated substrate (0.95 atom % nitrogen; 0.01 atom % sulfur) than on the HOOC-PEG coated substrate (3.05 atom % nitrogen; 0.13 atom % sulfur). This result demonstrates that a functional moiety on the polymeric compound that can covalently react with the functional moiety of the photoreactive compound yield coatings with lower protein adsorption.

Example 11

Benzophenones with different functional groups attached have different surface reactivity. The following types of benzophenone were evaluated for their ability to attach NHS-PEG onto a polystyrene surface in aqueous buffer: 4-Benzoyl benzylamine hydrochloride (Bz), 2,2',4,4'-Tetrahydroxybenzophenone (4xOH-Bz), 4-Hydroxybenzophenone (1xOH-Bz), 2-Aminobenzophenone-2'-carboxylic acid (1xNH2-1xCOOH-Bz), 3,4-Diaminobenzophenone (2xNH2-Bz), 2-Benzoylbenzoic acid (1xCOOH-Bz), 2-(3-Benzoylphenyl)propionic acid (1xCOOH—CH2-Bz). FIG. 11 shows the amount of oxygen and nitrogen, originating from coupled benzophenone and NHS-PEG, after treatment of the different types of benzophenone (2.5 mg/ml) together with NHS-PEG (7.5 mg/ml) on polystyrene after 60 minutes UV treatment. The amounts of oxygen and nitrogen were significantly higher for the sample with Bz+NHS-PEG and 1XCOOH—CH2-Bz+NHS-PEG compared with the other types of benzophenone that could not attach any significant amount of PEG on the samples. These results show that the use of benzophenone amine (Bz) is preferable for attaching PEG onto a polymer surface compared with other benzophenone variants in aqueous solvents.

Example 12

Benzophenone (Bz) can be used to attach different polymers onto a polystyrene surface. FIG. 12 shows an XPS analysis of polyacrylic acid (PAA), Polyvinylpyrrolidone (PVP), Polyacrylamide (PAAM) and dextran after 30 minutes UV illumination together with Bz in an aqueous medium. Coupling reactions using PAA of either low (5 kDa) or high (15 kDa) molecular weight resulted in high amounts of oxygen and nitrogen after UV exposure while no oxygen and nitrogen could be detected in the absence of UV exposure. This is indicative of efficient photochemical attachment of PAA. Coupling reactions using PVP and PAAM showed intermediate amounts of oxygen and nitrogen on the surface after UV illumination and low amount without UV illumination, in agreement with a less efficient but still UV illumination dependent covalent surface coupling.

Example 13

Compound microtiter plates made of polypropylene were coated with PEG using NHS-PEG (7.5 mg/ml) and Bz (2.5 mg/ml) in water and exposure to UV light. The drug astemizole was added in different concentrations to PEG-coated, uncoated, and glass coated plates and stored for 1 hour. The stored drug solutions were subsequently tested using automated patch clamp system, where the influence of the drug on the hERG ion channels was analysed by measuring the ion current and resulting in a calculated 1050 value. The drug solutions stored in uncoated plates resulted in higher 1050 values compared to drug solution stored in PEG-coated plates or glass-coated plates, while 1050 values from PEG-coated plates were almost equal to the values obtained on the reference glass-coated plates. The higher calculated 1050 value, i.e. lower effective drug concentration in the solution, is likely due to adsorption of the drug compound to well surfaces of the uncoated polypropylene plate. The results show that such unwanted drug adsorption can be strongly reduced by prior PEG-coating of the plate.

LIST OF REFERENCES

Guo, L. et al., "Automated electrophysiology in the preclinical evaluation of drugs for potential QT prolongation", Journal of Pharmacological and Toxicological Methods 52 (2005), 123-135

Shen, C. et al., "Chemical modification of polysulfone membrane by polyethylene glycol for resisting drug adsorption and self-assembly of hepatocytes", Journal of Membrane Science (2010)

Silvester, S. et al., "Overcoming non-specific adsorption issues for AZD9164 in human urine samples: consideration of bioanalytical and metabolite identification procedures", Journal of chromatography.B, Analytical technologies in the biomedical and life sciences 893-894 (2012), 134-143

Bergstrøm, K. et al., Reduction of fibrinogen adsorption on PEG-coated polystyrene surfaces, J. Biomed. Mater. Res., 1992, 26, 779-790

Ulbricht, M. el al., "Photo-induced graft polymerization surface modifications for the preparation of hydrophilic and low-protein-adsorbing ultrafiltration membranes", Journal of Membrane Science, 115 (1996), 31-47

Iguerb, O. et al. "Graft photopolymerization of polyethylene glycol monoacrylate (PEGA) on poly(methyl methacrylate (PMMA) films to prevent BSA adsorption", Surf. Interface Anal. 2008, 40, 386-390

DeFife K. M. et al., "Effects of photochemically immobilized polymer coatings on protein adsorption, cell adhesion, and the foreign body reaction to silicone rubber", Journal of Biomedical Materials Research, vol. 44, no. 3, pp 298-307, 1999

WO 90/00887

The invention claimed is:

1. A single-step method for applying a coating to a polymeric substrate comprising:
exposing a water-soluble photoreactive compound and a polymeric compound dissolved in an aqueous solvent to ultraviolet radiation in the presence of said polymeric substrate to obtain a covalently bound coating thereon comprising a reaction product of the photoreactive compound and the polymeric compound, said water-soluble photoreactive compound comprising a functional moiety capable of reacting with said polymeric compound and a latent functional group capable of covalent bond formation to said substrate in response to said ultraviolet radiation, said water-soluble photoreactive compound existing independently of and unbound to said polymeric compound when dissolved in said aqueous solvent,
wherein said photoreactive compound is selected from the group consisting of 4-benzoyl benzylamine, 3,4-diaminobenzophenone, 2-benzoyl benzoic acid, 4-benzoyl benzoic acid, 2-aminobenzophenone-2'-carboxylic acid, 2,2',4,4'-tetrahydroxybenzophenone, 2-acetylbenzoic acid, 4-acetylbenzoic acid, or an inorganic or organic salt thereof; and
wherein said polymeric compound is selected from the group consisting of polyethylene glycol (PEG), poly(vinyl pyrrolidone) (PVP), polyacrylic acid (PAA), polyacrylamide (PAAM), dextran, and a poly(oxazoline) compound as well as esters, amines, acids, succinimidyl-modified acids, maleimides, biotinylated esters, biotinylated amines, biotinylated acids, and biotinylated maleimide derivatives thereof.

2. The method according to claim 1, wherein said polymeric compound is selected from the group consisting of OMe-PEG-NHS (alpha-Methoxy-omega-carboxylic acid succinimidyl ester poly(ethylene glycol)), OPSS-PEG-NHS (alpha-[3-(o-Pyridyldisulfido)propanoylamido]-omega-carboxylic acid succinimidyl ester poly(ethylene glycol)), and Biotin-PEG-NHS (alpha-Biotin-omega-carboxylic acid succinimidyl ester poly(ethylene glycol)).

3. The method according to claim 1, wherein said solvent is selected from the group consisting of water, an aqueous solution of one or more inorganic or organic salts, an aqueous solution of an inorganic acid, and an aqueous solution of ammonia, wherein an aqueous solution of one or more inorganic or organic salts is selected from the group consisting of an aqueous solution of sodium carbonate, an aqueous solution of sodium hydrogen phosphate, an aqueous solution of potassium hydrogen phosphate, an aqueous solution of sodium chloride, an aqueous solution of potassium chloride, and Phosphate Buffered Saline (PBS).

4. The method according to claim 1, wherein the exposure to ultraviolet radiation is performed using radiation of a wavelength range from 250-400 nm.

5. The method according to claim 1, wherein the exposure to ultraviolet radiation is performed at a radiation dose in the range 1-300 J/cm$^2$.

6. The method according to claim 1, wherein the concentration of the photoreactive compound in the aqueous solvent is in the range of 2-50 mM.

7. The method according to claim 1, wherein the concentration of the polymeric compound in the aqueous solvent is in the range of 0.5-50 mM.

8. The method according to claim 1, wherein the polymeric substrate comprises a material selected from the group consisting of polystyrene (PS), Liquid Crystal Polymer (LCP), polyimide (PI), cyclic olefin copolymer (COC), poly(methyl methacrylate) (PMMA), poly(dimethyl siloxane) (PDMS), epoxy, poly(caprolactone) (PCL), polycarbonate (PC), polypropylene (PP), polyethylene (PE), poly(oxymethylene) (POM), polyamides (PA), polyesters, polyurethane (PUR), poly(ethylene oxide) (PEO), polyisoprene, poly(butadiene), poly(lactic acid) (PLA), poly(glycolic acid) (PGA), poly(vinyl pyrrolidone), hyaluronic acid (HA), heparin, alginate, agarose, collagen, gelatin, and copolymers and blends and cross-linked materials thereof.

\* \* \* \* \*